Sept. 23, 1924.

D. L. SWINDELL

GLASS DRAWING APPARATUS

Filed Nov. 20, 1920

David L. Swindell
INVENTOR

BY

ATTORNEY

WITNESS:

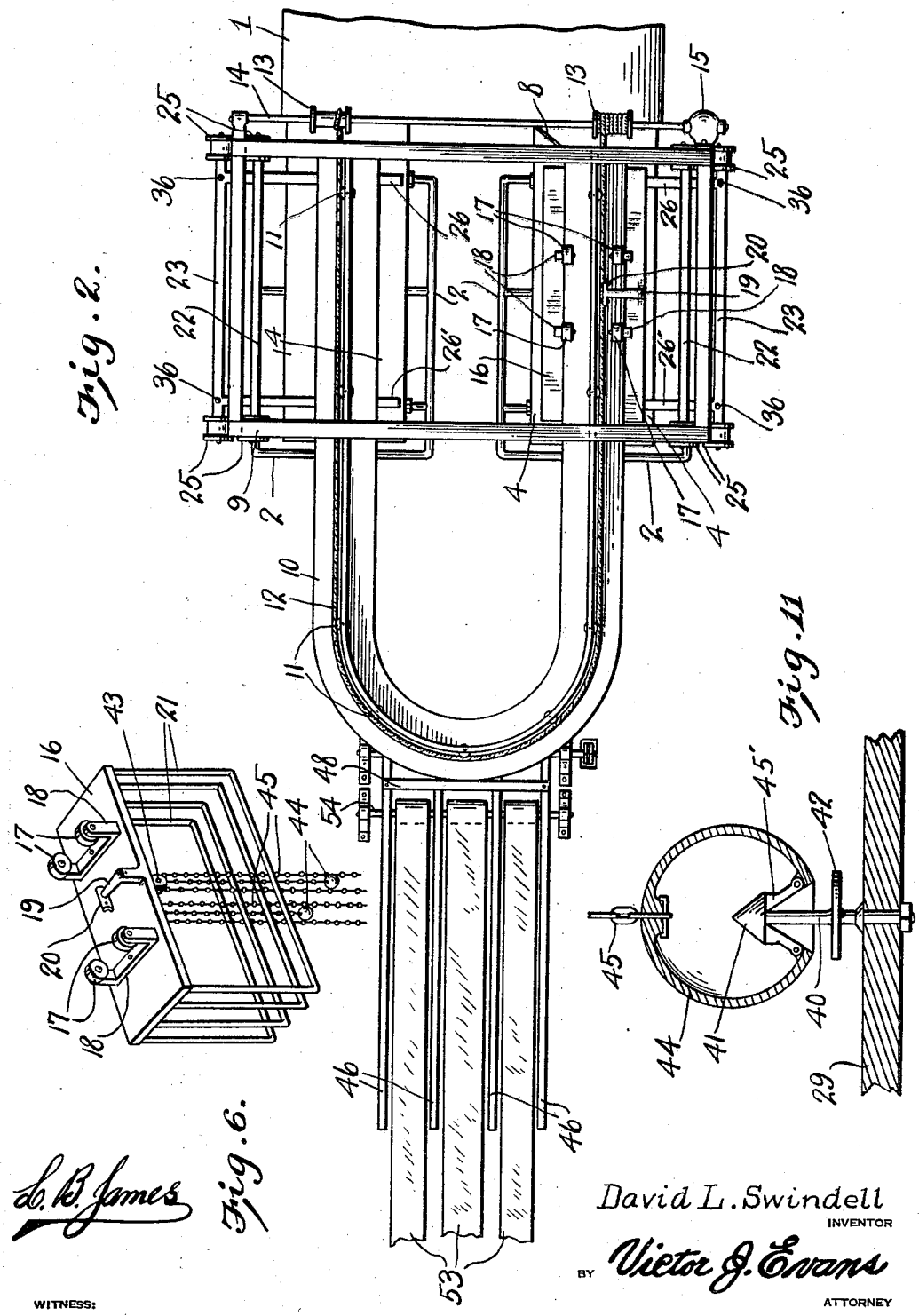

Sept. 23, 1924. 1,509,183
D. L. SWINDELL
GLASS DRAWING APPARATUS
Filed Nov. 20, 1920 4 Sheets-Sheet 3
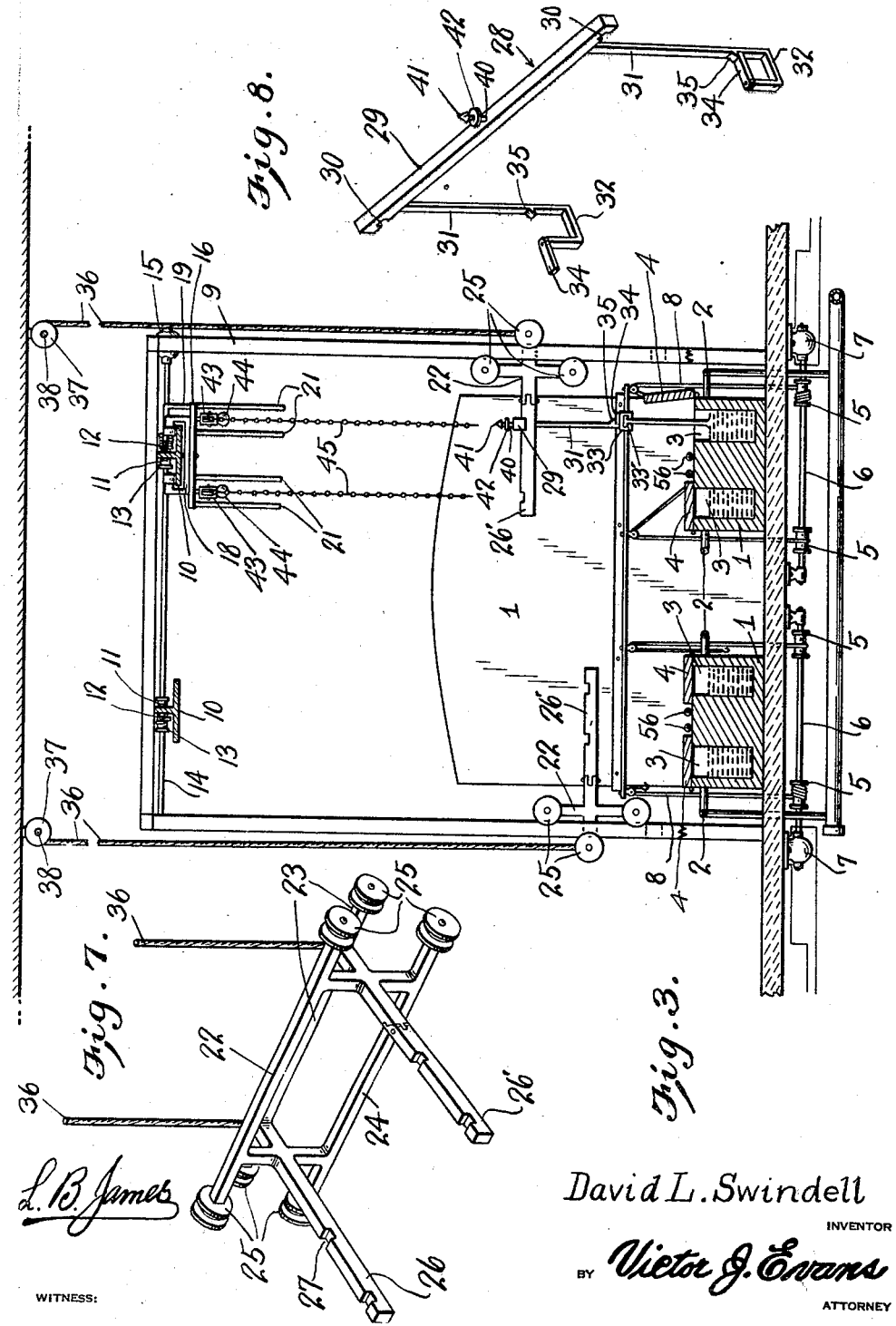
David L. Swindell
INVENTOR
BY *Victor J. Evans*
ATTORNEY
WITNESS: *L. B. James*

Sept. 23, 1924.  
D. L. SWINDELL  
GLASS DRAWING APPARATUS  
Filed Nov. 20, 1920  
4 Sheets-Sheet 4  
1,509,183
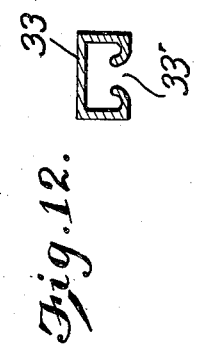
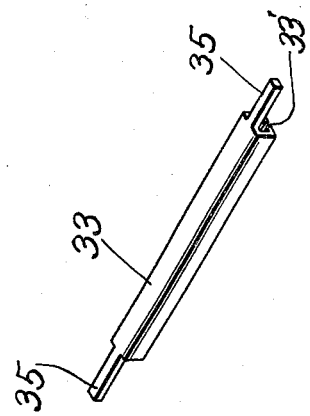
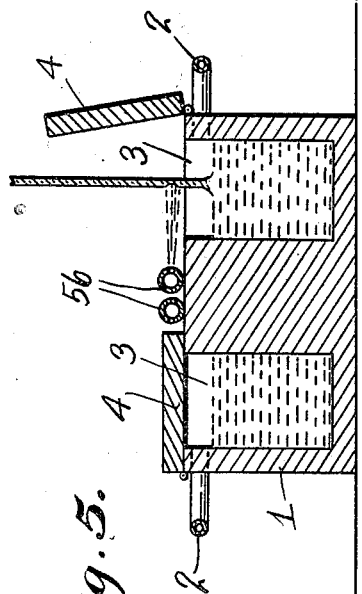
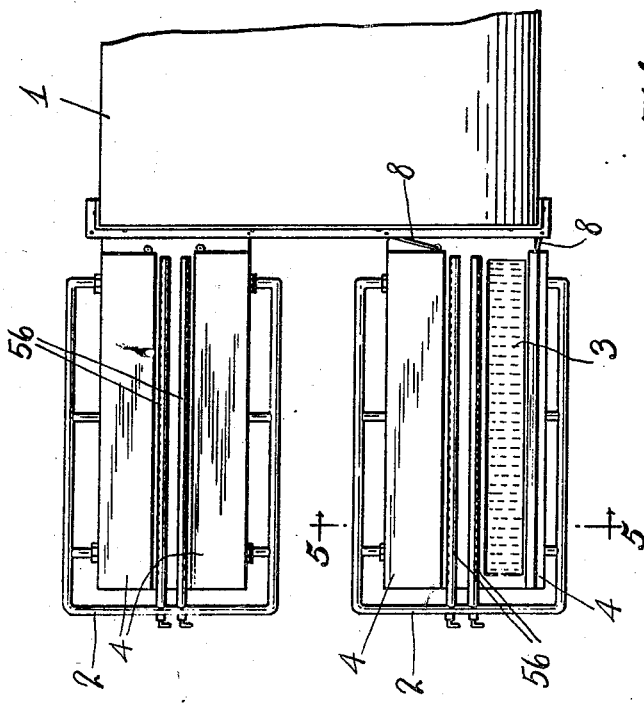
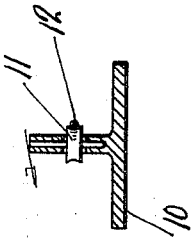
David L. Swindell  
INVENTOR  
BY Victor J. Evans  
ATTORNEY
WITNESS:  
L. B. James Patented Sept. 23, 1924.

1,509,183

UNITED STATES PATENT OFFICE.

DAVID L. SWINDELL, OF OKMULGEE, OKLAHOMA.

GLASS-DRAWING APPARATUS.

Application filed November 20, 1920. Serial No. 425,489.

*To all whom it may concern:*

Be it known that I, DAVID L. SWINDELL, a citizen of the United States, residing at Okmulgee, in the county of Okmulgee and State of Oklahoma, have invented new and useful Improvements in Glass-Drawing Apparatus, of which the following is a specification.

This invention relates to a glass drawing apparatus, the general object of the invention being to provide means for forming sheet glass, such as window glass and the like by means of a vertically movable bait of elongated form.

Another object of the invention is to provide means for conveying the sheet of glass after being drawn to a pivoted supporting member which can be swung into horizontal position to place the sheet of glass upon other conveying means which will take the sheet to a point where it can receive further treatment.

A further object of the invention is to provide a number of retorts having openings therein through which the bait passes and doors for closing such openings with means whereby when one door is open to permit the bait to enter the other doors are closed so that the molten mixture in said closed retorts will be heated to the proper temperature for drawing while the glass is being drawn from the open retort.

A further object of the invention is to provide means whereby the bait can be easily made to draw the glass from any desired retort.

A still further object of the invention is to provide a vertically movable carriage for moving the bait in its frame vertically and a horizontally movable carriage for conveying the glass from the first mentioned carriage to the supporting member, with means for automatically connecting the bait frame with the horizontally movable carriage when the vertical carriage reaches its upper limit of movement.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a plan view of the invention.

Figure 3 is a section on line 3—3 of Figure 1.

Figure 4 is a plan view of the retorts.

Figure 5 is a section on line 5—5 of Figure 4.

Figure 6 is a perspective view of the horizontally movable carriage.

Figure 7 is a like view of the vertically movable carriage.

Figure 8 is a perspective view of the bait supporting frame.

Figure 9 is a view of the bait.

Figure 10 is a cross sectional view through the horizontal track.

Figure 11 is a sectional detail view of the supporting member carried by the horizontal carriage for receiving the bait supporting frame from the vertical carriage.

Figure 12 is a cross section through the bait.

Figure 1:
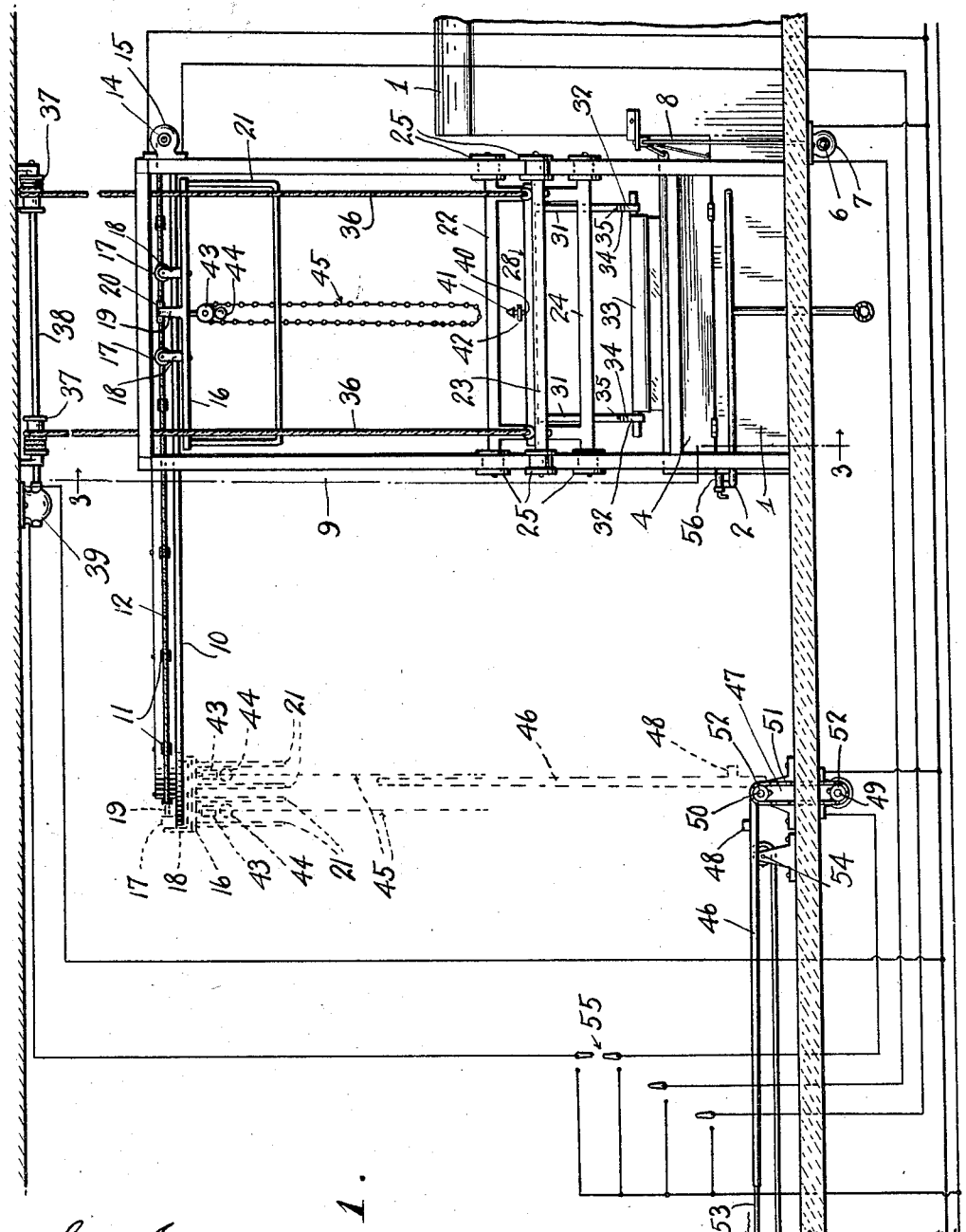
Figure 1 is a side elevation, partly diagrammatic, of the invention.

In these views 1 indicates the main retort and 2 indicates the small retorts connected with the main retort and each provided with a pair of chambers 3 which receive the glass from the main retort. The open tops of these chambers are closed by the doors 4 and these doors are adapted to be swung into open position by means of the drums 5 located on a shaft 6, which is rotated by the electric motor 7, the drums being connected with the doors by the cables 8 which pass over suitable pulleys. The cables are so wound upon the drums that when the shaft is rotated one cable will be wound upon its drum to open the door while the other cable will be unwound to permit the door to be closed. A framework is constructed adjacent the retorts 2 and the uprights 9 of this framework form a pair of vertical tracks, one at the outer side of each small retort. A horizontal track 10, of U-shape, is supported at the top of the framework, this track extending a considerable distance beyond the vertical tracks. This horizontal track has its parallel portions spaced inwardly from the vertical tracks and this horizontal track is of inverted T-shape in cross section as shown in Figure 10. The vertical part of the track carries guiding pulleys 11 for a cable 12 which has its ends connected with the drums 13, located on the shaft 14 which is rotated by means of the electric motor 15. The ends of the cable are wound in opposite directions on their drums so that as the cable is being wound upon one drum it is being unwound on the opposite drum. A carriage 16 is supported by the horizontal track. This carriage is provided with rollers 17 for engaging the horizontal part of the track, these rollers being carried by the upright parts of the arms 18 which are pivoted to the base of the carriage so that the rollers can accommodate themselves to the rounded part of the track. This carriage is connected with the cable by means of a bent arm 19 carried by the base and having a trough-shaped bracket 20 thereon which is suitably fastened to the cable. In this way the carriage is compelled to move with the cable so that it can be made to travel from one end of the horizontal track to the other. The carriage is provided with yoke-shaped guiding bars 21 which depend therefrom and are adapted to receive the bait supporting frame between them.

One of the vertically movable carriages is indicated at 22 in Figure 7. These carriages engage the vertical tracks and they are each formed of the outer bar 23 and the pair of inner bars 24. The ends of these bars support rollers 25 which engage the vertical track. Each carriage is also provided with a pair of inwardly extending arms 26 which are provided with the notches 27 and one of these arms is provided with a hinged part, as at 26'. These arms are adapted to support the bait supporting frame 28 which consists of the cross bar 29 having notches 30 therein for engaging with a pair of the notches 27, and the depending bars 31 having hooked lower ends 32 for receiving the bait 33. The bait is held in the hooked ends by means of the pivoted pieces 34 which are pivoted to the extremities of the hooks and are adapted to be swung under the projections 35 when in closed position, to hold the bait in place while being dipped in the molten glass.

As shown in Figure 9 this bait is of rectangular shape in cross section with a slot 33' in its bottom to permit the molten glass to enter the chamber in the bait. The top part of the bait is provided with extensions 35 at its ends which are adapted to engage the hooked ends of the bars 31. Each of the vertically movable carriages is connected with a pair of cables 36 which have their upper ends secured to the drums 37 which are located on the shaft 38 and this shaft is rotated by the electric motor 39. When this motor is in operation the cable will be wound on the drums and thus lift the carriages.

The bar 29 of the bait supporting frame has secured to its center part a shaft 40 which is provided with a conical head 41 and a disc 42 intermediate its ends. The carriage 16 carries a pair of blocks 43, one of which is located between each pair of guiding yokes 21. A spherical member 44 is connected with one end of the cable or chain 45 of each block and each member has an opening in its lower part for receiving the conical head 41 of the shaft 40. Fingers 45' are hinged to the spherical member adjacent the walls of the opening and are so arranged as to permit the head to pass into the opening, moving the fingers apart and then after the head has passed said fingers they will swing together again and engage the under side of the head and thus prevent its withdrawal.

A fork-shaped supporting member 46 is pivoted at its lower end to the supports 47 which are arranged under the outer rounded end of the horizontal track. This fork-shaped member has a cross piece 48 adjacent its pivoted end which is adapted to receive the lower edge of the glass sheet. This supporting member is raised and lowered by means of the motor driven shaft 49 which is connected to the pivotal shaft 50 of the supporting member by the chains 51 and the sprockets 52. By actuating the motor which is connected with the shaft 49 in either one direction or the other the supporting member may be moved from a horizontal position to a vertical position or vice versa. When said member is in horizontal position its forks will pass between a plurality of conveyor belts 53, which are suitably driven, so that the sheet of glass on said member will be deposited upon said belts and these belts will carry the sheet to a point where it will receive further treatment. As shown in the drawings the shaft 54 for the rollers at one end of the belts is adjacent shaft 50.

The various motors are of the reversible type and are controlled by the switches 55 which are so located that the various motors can be controlled by one or more operators.

Burners 56 are arranged adjacent the open ends of the chambers 3 for separating the formed sheet from the material within the chamber. The cables are preferably connected with the doors 4 by hooks and eyes so that the cables can be easily detached from the doors to permit both doors of each pair of chambers to be closed when the retort is not in use.

The operation of the apparatus is as follows: One of the vertical carriages is lowered, after having the bait supporting frame with the bait therein placed thereon, so that the bait will enter the molten glass in one of the chambers, the door of this chamber having first been opened. The motor is then reversed to raise the carriage by means of the cables and drums to raise the bait from the chamber. It will be understood that as the bait is drawn from the chamber it will carry some of the molten glass with it, thus the sheet will be formed. This sheet will be of a width equal to the chambered part of the bait. After the bait has been lifted from the molten glass the pieces 34 are swung to open position. When the sheet is of the desired length it is cut off at the lower end by the flame from the burners 56. It will of course be understood that the carriage is stopped when this cutting off operation is being performed. After the operation is completed the carriage is again started on its upward movement. As the carriage nears the end of its upward movement the arms 26 will pass to the sides of the horizontal carriage, which has been properly positioned, and the bar 29 of the bait supporting frame which is supported on the arms 26 will pass between the yoke members 21 and the conical head 41 of shaft 40 will engage the fingers 45' of the spherical member 44, pushing said fingers apart, until the head passes above the fingers, when said fingers will engage the under side of the head and thus the bait supporting frame will be engaged with the horizontal carriage. The carriage 22 is then lowered slightly to disengage the bait supporting frame from the arms 26 and the arm 26' is swung outwardly to permit the glass sheet to pass by. The motor 15 is then started to impart movement to the cable 12. The movement of this cable will cause the horizontal carriage to move towards the curved end of the horizontal track and as the bait supporting frame is now connected with said horizontal carriage the bait and the sheet of glass will be carried along with the carriage. The carriage is stopped, by stopping the motor, when it reaches the central part of the curved portion of the track and then the member 46 is swung upwardly alongside the sheet and then the sheet is lowered by playing out the cable or chain 45 until it rests upon the cross bar 48 on the supporting member 46. The bait supporting frame is lowered sufficiently to disengage the bait, thus freeing the sheet of glass and the bait at the upper end thereof from the bait supporting frame and the horizontal carriage. The supporting member 46 is then moved into its horizontal position, carrying the sheet of glass with it and when the forks of said member pass between the belts the sheet will be transferred to said belts and they will take it to the place where it is to receive further treatment. The bait supporting frame is then removed.

As soon as the sheet has been separated from the material within the chamber, the door of this chamber is closed so that the material separated from the sheet can be remelted. The drawing shows the sheet being formed from one of the outer chambers. If the material is taken from the inner chamber the bait supporting member would be placed in the notches at the ends of the arms 26. While one sheet of glass is being transported by the horizontal carriage another sheet is being formed at the other side of the apparatus and when the horizontal carriage has been relieved of the first sheet it can be pulled to the opposite end of the horizontal track to receive the second sheet. While the second sheet is being handled a third sheet may be drawn from the inner chamber of the first retort.

It will thus be seen that my apparatus will produce sheet glass very easily and quickly and it can be operated by the minimum number of skilled operators.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising a straight bait bar, a vertically movable carriage, a supporting frame for the bait bar removably supported in the carriage, a horizontally movable carriage, means thereon for automatically engaging the supporting frame when the vertically movable carriage brings said frame adjacent the horizontally movable carriage and means for moving said carriages.

2. An apparatus of the class described comprising a bait, a supporting frame in which the bait is removably supported, a vertically movable carriage, a horizontally movable carriage, means for moving the carriages and automatic means for transferring the bait supporting frame from the vertically movable carriage to the horizontally movable carriage.

3. An apparatus of the class described comprising a pair of retorts, vertically movable carriages, a track for each carriage arranged adjacent each retort, a bait bar, a supporting frame for the bait bar removably carried by each carriage, a horizontal track having its ends located adjacent the vertical track, a horizontally movable carriage on said track and means for transferring the supporting frame from the vertically movable carriages to the horizontally movable carriage.

4. An apparatus of the class described comprising a retort, a straight bait bar, a supporting frame in which the bait bar is removably arranged, a vertical track, a carriage thereon, means for removably supporting the supporting frame on said carriage, a horizontal track, a carriage thereon, means for transferring the supporting frame from the vertically movable carriage to the horizontally movable carriage, a pivotally mounted forked member, means for moving the same into a vertical position to receive the sheet of glass from the horizontally movable carriage and then swinging said member into horizontal position and conveying means receiving the sheet of glass from said member when in horizontal position.

5. An apparatus of the class described comprising a retort, a vertical track located adjacent the same, a carriage operating on said track, a bait bar supporting frame removably supported on said carriage, a bait bar removably seated in said frame, a horizontal track, a carriage engaging the same, transferring means on the horizontal carriage for receiving the bait supporting frame from the vertical carriage, a cable connecting the said transferring means with the horizontal carriage, a pulley over which the cable passes, means for moving said carriages, a pivoted forked member, means for moving the same vertically to receive the sheet of glass from the horizontal carriage and then swinging it to horizontal position and conveying means for receiving the sheet of glass from the forked member when in horizontal position.

In testimony whereof I affix my signature.

DAVID L. SWINDELL.